Sept. 27, 1949. J. H. TURNER 2,482,885
AUXILIARY GAS TANK ASSEMBLY
Filed Dec. 7, 1945
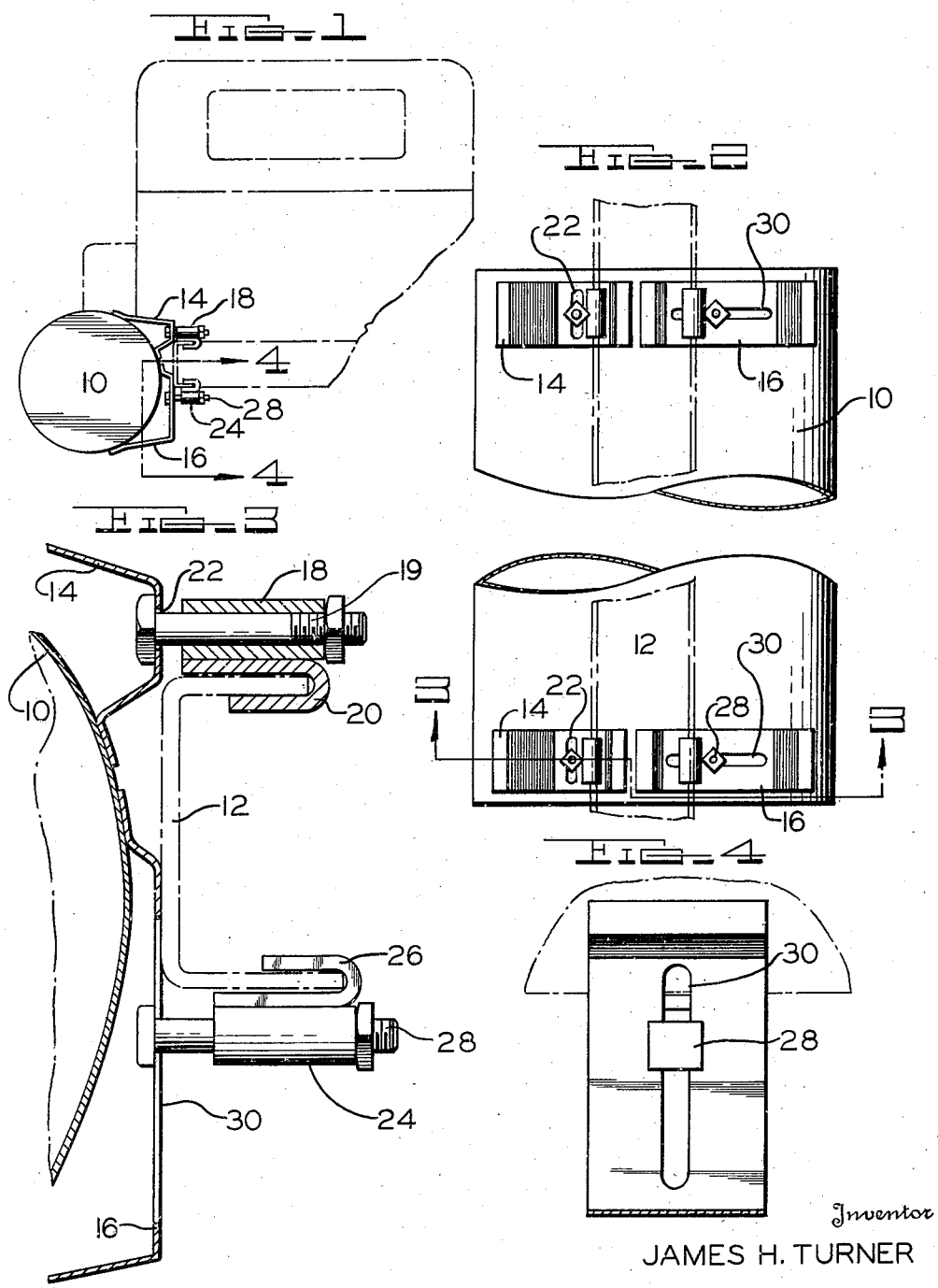
Inventor
JAMES H. TURNER
By Parker & Burton
Attorney Patented Sept. 27, 1949

2,482,885

UNITED STATES PATENT OFFICE 2,482,885

AUXILIARY GAS TANK ASSEMBLY

James H. Turner, Detroit, Mich.

Application December 7, 1945, Serial No. 633,568

1 Claim. (Cl. 280—5)

1

This invention relates to an improved auxiliary gas tank assembly for motor vehicles and particularly to a gas tank assembly so constructed as to be capable of being readily attached to a channel section side frame member of a motor vehicle.

It is common practice to secure an auxiliary gas tank to the side frame member of a truck or the like to carry an additional supply of gas. Various types of bracket attachments have been employed for this purpose.

An object of this invention is to provide a tank with such an attachment which is of simple, rugged construction, which is inexpensive and which is capable of being easily attached to or detached from the channel section of a side frame member of a vehicle by a workman using only a wrench.

Channel section side frame members as used on trucks differ not only in width but the frame structures differ in that the cross pieces which extend between the side frame members vary as to location lengthwise of the side frame members. The most suitable place for the attachment of a tank may be that at which the presence of a cross piece between the two side frame members interferes with the securement of the upper clamp member of the bracket to the side frame member.

An object is to provide a tank with an attachment or bracket support whereby it may be secured to the channel section side frame member of the vehicle, which bracket support is of such a character that it may be easily and quickly adjusted to permit the tank to be secured to side frame members of different widths, and wherein, without shifting the position of the tank lengthwise of the side frame members, that part of the attachment which engages the side frame member may be shifted lengthwise therealong and shifted relatively to the tank to engage the side frame member at different points throughout a selected portion of its length.

Another object of this invention is to provide a bracket structure at each end of the tank which bracket structure includes a pair of clamps adapted to secure the bracket to the side frame member. One clamp of each bracket extends above the side frame member and the other clamp of each bracket extends below the side frame member. One clamp is adjustable toward and away from the other clamp transversely of the side frame member to accommodate side frame members of different width. The other clamp is adjustable lengthwise of the side frame member

2 and relative to the tank to engage the side frame member at different points along a selected portion of its length.

Other objects, advantages and meritorious features will more fully appear from the following description, appended claims and accompanying drawings, wherein:

Figure 1 is an end elevation of a tank secured to a side frame member of a vehicle.

Figure 2 is a side elevation of a tank secured to a side frame member taken from the frame side.

Figure 3 is a sectional view taken on the line 3—3 of Figure 2.

Figure 4 is a sectional view taken on the line 4—4 of Figure 1.

In the drawing, a tank of the character used as an auxiliary gas tank and commonly secured to the side frame member of a vehicle is indicated at 10. A channel section side frame member of conventional design and to which the tank is secured is indicated as 12. This side frame member has an upper flange or side wall and a lower flange or side wall. These side frame members are provided in different widths. It is common practice to provide cross frame members or struts extending between the two side frame members 12 of a vehicle chassis. The tank 10 is secured to the outside of the side frame member at a convenient place.

The instant invention relates to the means for securing the tank in place to the side frame member. It comprises a pair of bracket structures adjacent each end of the tank. These two bracket structures are similar. Each bracket structure here shown embodies an upper bracket portion 14 and a lower bracket portion 16 which bracket portions are secured to the side wall of the tank by welding or the like. The two bracket portions might be made in a single unit and welded to the tank if desired. Each bracket portion is provided with a clamp which is adapted to engage the side frame member of the vehicle.

The upper clamp comprises a part 18 which carries a hook-shaped element 20 that is adapted to be received over the edge of the upper flange of the side frame member as shown particularly in Figure 3. This part 18 also carries a bolt 19 which is engaged within a slot 22 which slot extends transversely of the bracket 14 and lengthwise of the side frame member 12 to which the bracket is attached.

It is apparent that the upper bolt and clamp are adjustable to different positions along the slot transversely of the bracket and parallel to the side frame member 12. This adjustment is for the purpose of placing the upper clamp at different positions along a selected portion of the side frame member to clear a cross piece which might extend between the two side frame members. It might not be convenient to adjust the tank along the side frame member to clear such a cross piece and this permitted adjustment of the clamp relative to the tank and relative to the side frame member fulfills the requirement.

The lower clamp comprises a part 24 provided with a hook 26 which hook is adapted to engage over the margin of the lower flange or side wall of the channel section. The clamp portion 24 also carries a bolt assembly 28. This bolt extends through a slot 30 in the bracket and is adjustable along said slot lengthwise of the bracket and transversely of the side frame member 12. It is apparent that this adjustment will permit the tank to be secured to side frame members of different widths.

It will be seen therefore that the upper clamp which extends over the upper flange of the side frame member is adjustable lengthwise of the frame member and that the lower clamp which extends under the bottom flange of the side frame member is adjustable transversely of the side frame member. One clamp therefore is not only adjustable toward and away from the other clamp but also one clamp is adjustable toward and away from a vertical line passing through the other clamp. Such a tank is capable of being readily secured to any channel cross section side frame member.

What I claim is:

A tank adapted to be secured to a vehicle channel frame member, said tank provided at each end with a bracket structure, each bracket structure having an upper portion and a lower portion each adapted to engage the vehicle channel frame member, one portion having a slot extending parallel to the frame member engaged thereby, the other portion having a slot extending perpendicularly to the frame member engaged thereby, a clamp supported for slidable movement linearly through each slot, the upper clamp having a part adapted to engage over the edge of the upper side wall of the frame member, the lower clamp having a part adapted to engage over the edge of the lower side wall of the frame member, each clamp having a part adjustable to draw the clamp toward the tank against the side frame member.

JAMES H. TURNER.

REFERENCES CITED

The following references are of record in the file of this patent:

UNITED STATES PATENTS

| Number | Name | Date |
| --- | --- | --- |
| 2,357,148 | Turner | Aug. 29, 1944 |
| 2,410,182 | Prior | Oct. 29, 1946 |